United States Patent
Minemura et al.

(10) Patent No.: US 6,678,469 B1
(45) Date of Patent: Jan. 13, 2004

(54) RECORDED INFORMATION REPRODUCING APPARATUS

(75) Inventors: Atsushi Minemura, Tokyo (JP); Takashi Ishida, Kanagawa (JP); Tomomi Kaga, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/496,303

(22) Filed: Feb. 1, 2000

(30) Foreign Application Priority Data

Feb. 10, 1999 (JP) .......................................... 11-023543

(51) Int. Cl.[7] .............................. H04N 5/85; H04N 5/91
(52) U.S. Cl. ......................................... 386/125; 386/82
(58) Field of Search ............................... 386/125, 126, 386/124, 105, 106, 1, 6, 7, 40, 45, 46, 68, 70, 82, 83; 725/86, 87, 101, 97; H04N 5/85, 5/91

(56) References Cited

U.S. PATENT DOCUMENTS

| | | | |
|---|---|---|---|
| 5,754,730 A | * | 5/1998 | Windrem et al. |
| 5,815,146 A | | 9/1998 | Youden et al. |
| 6,115,536 A | * | 9/2000 | Iwasaki et al. |

FOREIGN PATENT DOCUMENTS

EP          0 750 425 A2     12/1996

OTHER PUBLICATIONS

10–003357 A (document taken from: Patent Abstracts of Japan, vol. 1998, No. 5, Apr. 1998).
10–210419 A (abstract taken from: Patent Abstracts of Japan, vol. 1998, No. 13, Nov. 1998).
07–212745 A (abstract taken from: Patent Abstracts of Japan, vol. 1995, No. 11, Dec. 1995).
10–285556 A (abstract taken from: Patent Abstracts of Japan, vol. 1999, No. 1, Jan. 1999).
XP002167886: "Video server technique for VCR–like playbacks"; Sakamoto, et al; NTT Review, vol. 10, No. 3, May 1998, pp. 68–78.
XP000775875: "Disk Placement for Arbitrary–Rate Playback in an Interactive Video Server"; Kwon, et al; Multimedia Systems; vol. 5, 1997, pp. 271–281.
XP000783202: "Synchronous RAID5 with Region–Based Layout and Buffer Analysis in Video Storage Servers"; Park, et al; Ieice Transactions on Information and Systems; Vol E81–D, No. 8, Aug. 1998, pp. 813–821.

* cited by examiner

*Primary Examiner*—Robert Chevalier
(74) *Attorney, Agent, or Firm*—Pearne & Gordon LLP

(57) ABSTRACT

A continuous recorded information reproducing apparatus which has disk management means 201 for managing the load state on each disk, read prediction control means 202 for instructing read means to read data so as not to hinder read of any other reproduction data, and reproduction start time alternative rule storage means 204 for storing an alternative rule for reading alternative data as required at the time, wherein at the reproduction start time of continuous data, data is read from the disk from which data can be read within the one-frame time, so that the response speed at the reproduction start time can be guaranteed within the one-frame time.

15 Claims, 11 Drawing Sheets

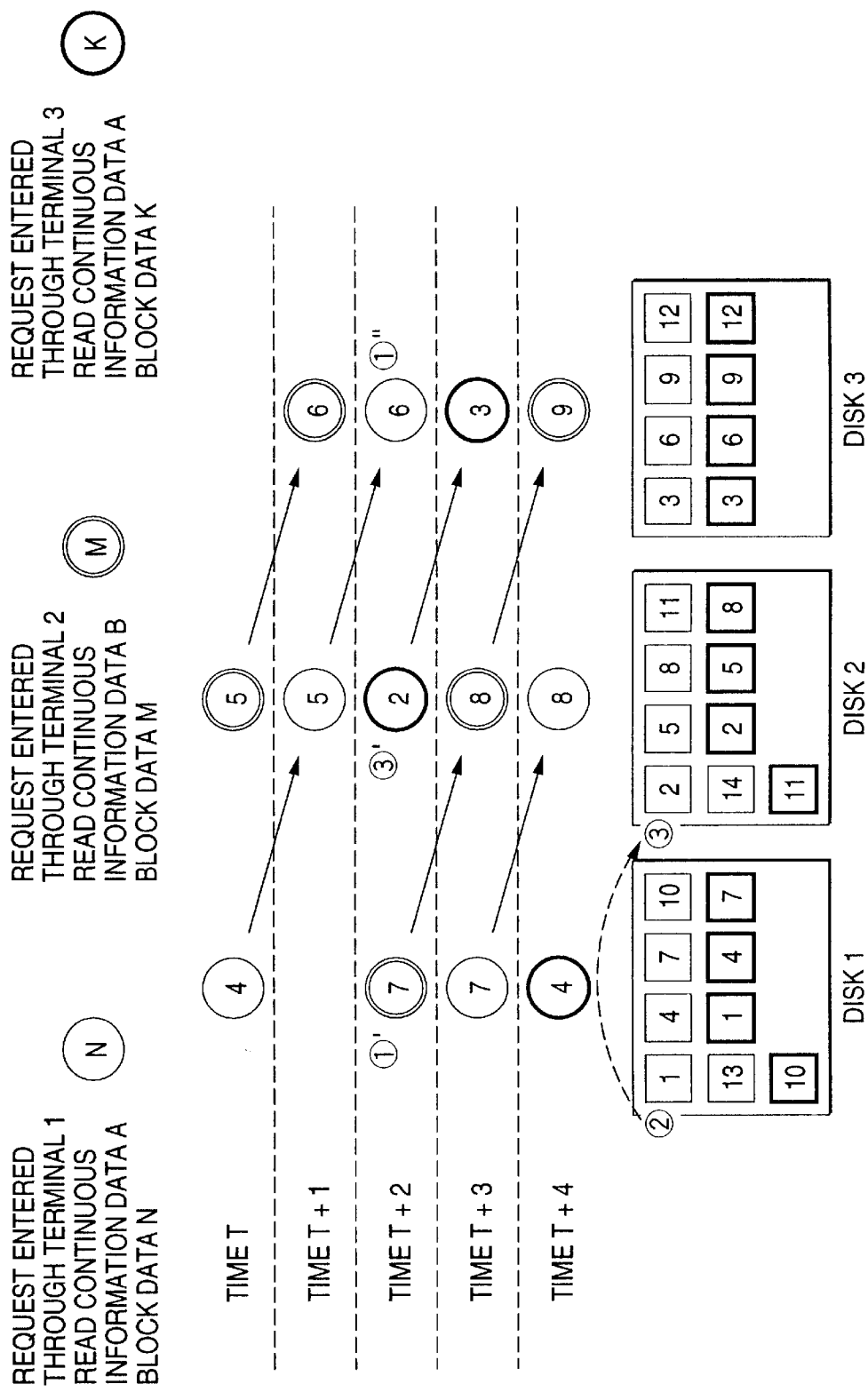

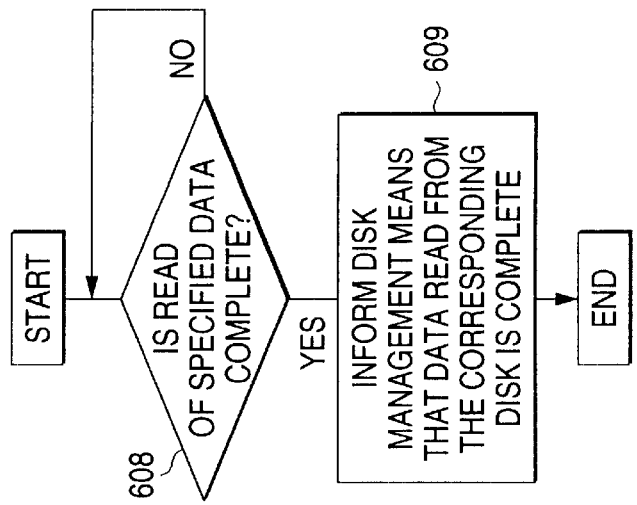
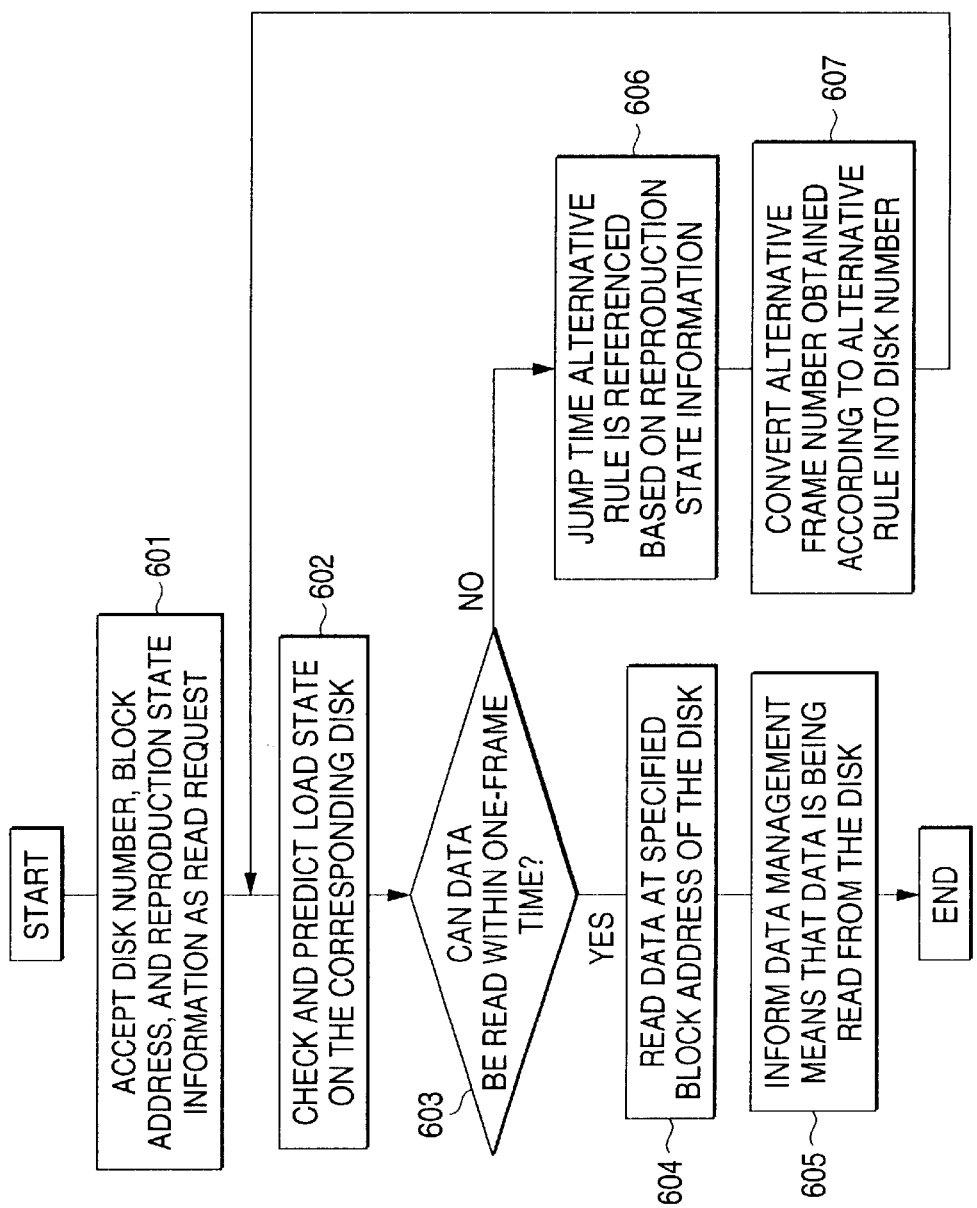

RECORDED INFORMATION REPRODUCING APPARATUS

BACKGROUND OF THE INVENTION

This invention relates to a recorded information reproducing apparatus that can make a high-speed response at the reproduction start and the jump operation in reproduction of continuous information of a moving picture, voice, etc., and can reproduce information in mixed modes of standard-speed reproduction and special reproduction at double speed, quad speed, etc., (forward, backward).

Hitherto, a video server has been available as a system for recording and reproducing continuous information of a moving picture, voice, etc. The video server generally consists of a disk array, a memory buffer, read request acceptance means, and data read means. The disk array is used as RAID (redundant array of independent disks) for striping data and storing the data. When data is read, an area containing desired data is read from disk and is stored in the FIFO memory buffer. A response to a data read request is completed by separating the desired data from the buffer and sending the data to the read requester.

To guarantee the data read speed, the video server processes read of continuous information data requested by a terminal from disk in order within a given period called a time slot. Since read of the data requested by the terminal and assigned to the time slot is always processed while one cycle of the time slot is completed, the read speed from the disk is guaranteed. If a new read request is made on the terminal, for example, for reproduction start or jump, it is newly assigned to time slot.

If new assignment to time slot is possible in the time slot at the request acceptance time, when the read request is accepted while processing stored in the first portion in the time slop is performed and processing of the read request is assigned to the end of the time slot, the read request wait time reaches the maximum and becomes the time as much as one cycle of the time slot.

Since each request for reading data from disk is once processed in one period of a time slot, a sufficient amount of data that can respond to read request from a terminal during the one period must be read into the memory buffer at a time.

However, in the above-described related art, when reproduction of a moving picture is started, data is supplied to the memory buffer before the moving picture can be reproduced. This means that the time taken for filling the memory buffer with data becomes the response time. This also applies to reproduction position change made because of jump during reproduction. To change the reproduction position, it is necessary to discard the data in the buffer, newly read data at the jump destination position and later, and fill the buffer with the read data. Thus, a high-speed response cannot be provided at the moving picture reproduction start time or the jump operation.

For example, in the video server in the related art, the response time at the moving picture reproduction start time is as follows: Assuming that the number of terminals is 40, that the number of disks is 5, that the data read unit is 256 Kbytes, and that the average read speed of one disk when data is read in (256/5)-Kbyte units is 1.5 Mbytes/sec, the required time for one cycle of a time slot, T, is $$T=256\times40/(1.5\times1000\times5)$$

about 1.4 seconds. That is, the response to the reproduction start takes 1.4 seconds.

The video server in the related art is predicated on sequential read of data of continuous information of a moving picture, voice, etc. This can also be understood from the fact that data is preread sequentially into the memory buffer described above. Then, if data of continuous information is specially reproduced at double speed, quad speed, etc., the data read speed from disk also becomes double or quad, and the buffer memory needs to have twice or four times the normal capacity. This means that when special reproduction at double speed or quad speed is executed from standard-speed reproduction, a high-speed response cannot be provided either.

Thus, whenever the reproduction state is changed at the standard reproduction start time, the special reproduction start time, the jump time, etc., a high-speed response cannot be provided.

SUMMARY OF THE INVENTION

It is therefore an object of the invention to provide a recorded information reproducing apparatus that can make a high-speed response at the reproduction start time and the jump time in reproduction of continuous information of a moving picture, voice, etc., and can make a high-speed response if change is made from standard-speed reproduction to special reproduction at double speed, quad speed, etc., (forward, backward), and can reproduce information in mixed modes of standard-speed reproduction and special reproduction.

To the end, according to a first aspect of the invention, there is provided a continuous recorded information reproducing apparatus for adopting a data record technique of storing continuous information data of moving picture information, voice information, etc., on a plurality of disks in order from the top in arbitrary data size units and reading and reproducing the recorded continuous information data, the continuous recorded information reproducing apparatus comprising disk management means for managing the load state on each disk, namely, the data read state, read means for reading data from a specified position of a disk, read prediction control means for accepting a read request containing data read position information together with reproduction state information indicating reproducing or reproduction start, looking up the load state on each disk in the disk management means, determining whether or not the requested data can be read within a stipulated time based on the load state on the disk storing the data and prediction of a data read state at the next time, and instructing the read means to read the data from the specified position of the disk, reproduction start time alternative rule storage means for storing an alternative rule for reading alternative data at reproduction start time, and read position conversion means for converting the data read from the specified position of the specified disk into a disk from which data can be read within the stipulated time and a read position on the disk according to the rule stored in the reproduction start time alternative rule storage means based on the reproduction state information indicating the reproduction start.

Thus, the continuous recorded information reproducing apparatus can be provided that can guarantee the response speed at the reproduction start time within the stipulated time by reading data from the disk from which data can be read within the stipulated time at the reproduction start time of new continuous data although read of any other data being reproduced is not hindered.

According to a second aspect of the invention, there is provided a continuous recorded information reproducing apparatus comprising jump time alternative rule storage means for storing an alternative rule at the jump time for changing the reproduction position.

Thus, the continuous recorded information reproducing apparatus can be provided that can guarantee the response speed at the jump time within the stipulated time because of reading data from the disk from which data can be read within the stipulated time at the jump time in reproduction of continuous data although read of any other data being reproduced is not hindered.

According to a third aspect of the invention, there is provided a continuous recorded information reproducing apparatus comprising special reproduction time alternative rule storage means for storing an alternative rule at the time of special reproduction such as double-speed reproduction or quad-speed reproduction.

Thus, the continuous recorded information reproducing apparatus can be provided that can execute special reproduction data read and make a high-speed response that the required time when the reproduction state is changed from the standard reproduction state to special reproduction is also within the stipulated time although read of any other data being reproduced is not hindered.

According to a fourth aspect of the invention, there is provided a continuous recorded information reproducing apparatus comprising read request acceptance and issuance means for accepting a read request, assigning a priority to the read request, and periodically issuing the read request.

Thus, the continuous recorded information reproducing apparatus can be provided that can make a high-speed response to the reproduction start time of new continuous data, jump in reproduction of continuous data, or reproduction state change from standard reproduction to special reproduction within the stipulated time in mixed modes of standard reproduction and special reproduction although read of any other data being reproduced is not hindered.

The first to fourth aspects of the invention can be modified as follows:
- any combination thereof;
- a data record technique in which if the continuous information data is moving picture information, the information data pieces are stored under the same rule (for example, on a plurality of disks in order from the top) in data size units of one-frame data of the moving picture;
- a data record technique in which if the continuous information data is moving picture information in an MPEG format, the information data pieces are stored under the same rule (for example, on a plurality of disks in order from the top) in 1-GOP data units;
- the stipulated time for determining whether or not data can be read is the one-frame time in a moving picture, for example, 33 msec at a rate of 30 frames per msec;
- the reproduction start time alternative rule is to forward shift one frame at a time, namely, k+n (n=1, 2, 3 . . . ) with respect to read request frame number k;
- the jump time alternative rule is to forward shift one frame at a time, namely, k+n (n=1, 2, 3 . . . ) with respect to read request frame number k;
- the jump time alternative rule is to backward shift one frame at a time, namely, k−n (n=1, 2, 3 . . . ) with respect to read request frame number k;
- the special reproduction time alternative rule is to forward shift one frame at a time, namely, k+n (n=1, 2, 3 . . . ) with respect to read request frame number k;
- the special reproduction time alternative rule is to backward shift one frame at a time, namely, k−n (n=1, 2, 3 . . . ) with respect to read request frame number k;
- if the special reproduction time alternative rule is to shift a maximum of n−1 frames at a time at n-times-speed reproduction time and an alternative frame is retrieved, when it is determined that data cannot be read within one-frame time, the frame data read at the preceding time is used, etc.

BRIEF DESCRIPTION OF THE DRAWINGS

FIG. 4 is a time transition diagram of data read requests in the first embodiment of the invention;

FIGS. 6A and 6B are flowcharts to show an example of a data read procedure in the second embodiment of the invention;

DETAILED DESCRIPTION OF THE PREFERRED EMBODIMENTS

Referring now to the accompanying drawings, there are shown embodiments of the invention. It is to be understood that the invention is not limited to the embodiments thereof, and many apparently widely different embodiments of the invention may be made without departing from the spirit and scope thereof First Embodiment A first embodiment of the invention will be discussed with reference to FIGS. 1 to 4.

In the description to follow, as continuous information data, moving picture data is taken as an example, and as the stipulated time, the one-frame time in a moving picture is taken as an example.

Figure 1:
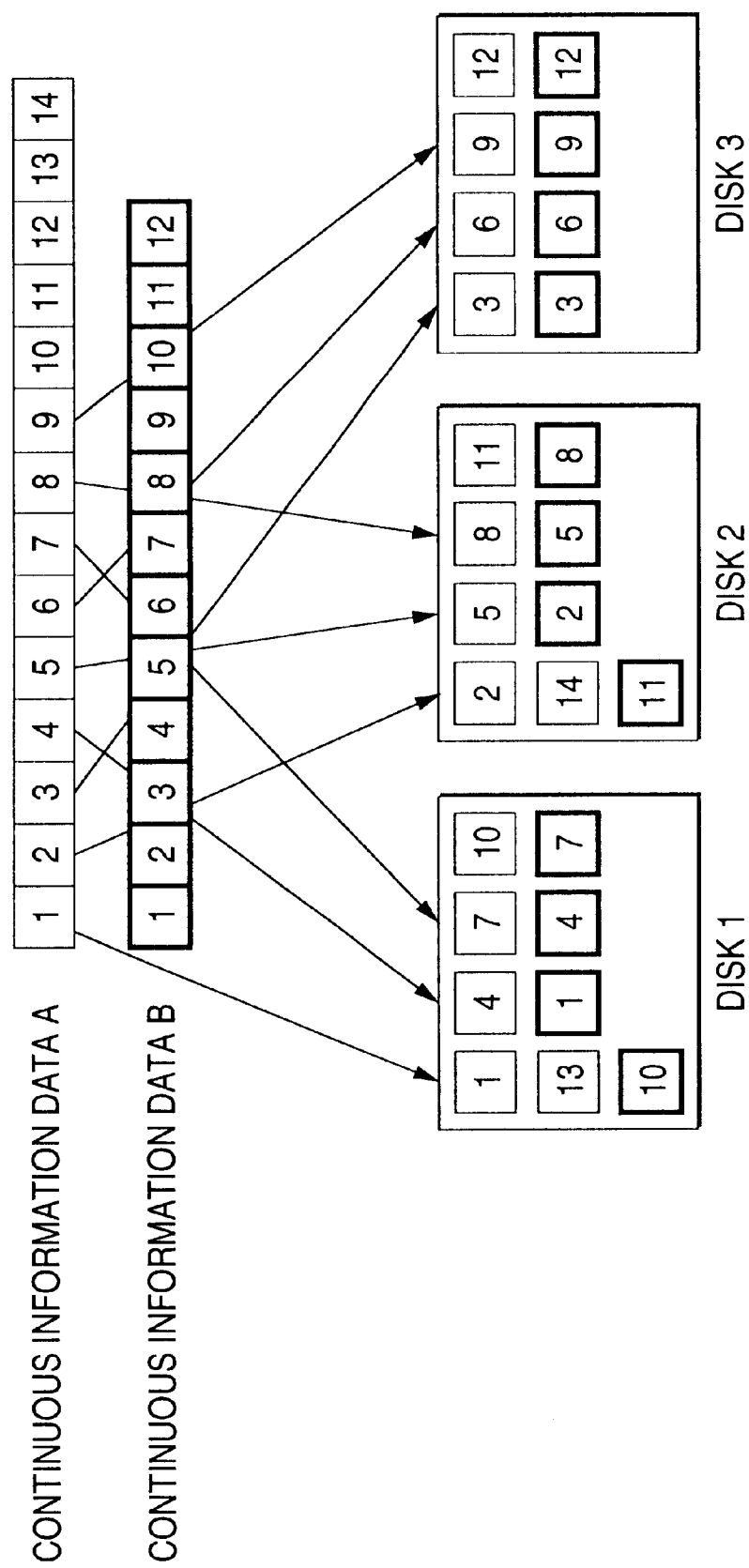
FIG. 1 is a schematic drawing of a data storage scheme of the invention described in a first embodiment of the invention.

FIG. 1 shows a data storage scheme of continuous information in the invention. Continuous information data is separated starting at the top of the data (the separation units will be hereinafter referred to as data blocks), and the data blocks are stored in order on disks making up a disk array. In FIG. 1, data block 1 at the top of continuous information data A is stored on disk 1 and data block 2 is stored on disk 2. Thus, data blocks 1, 4, 7, 10, and 13 are stored on disk 1. Likewise, data block 1 at the top of continuous information data B is stored on disk 1 and data block 2 is stored on disk 2.

Here, the data block may consist of data forming one frame if the continuous information is a moving picture, or two or more frames may make up one data block as GOP (Group of Picture) in MPEG, for example. In the description to follow, it is assumed that one-frame data is stored in one data block as an example. An address for specifying a storage location of a data block in a disk will be hereinafter referred to as a block address.

Figure 2:
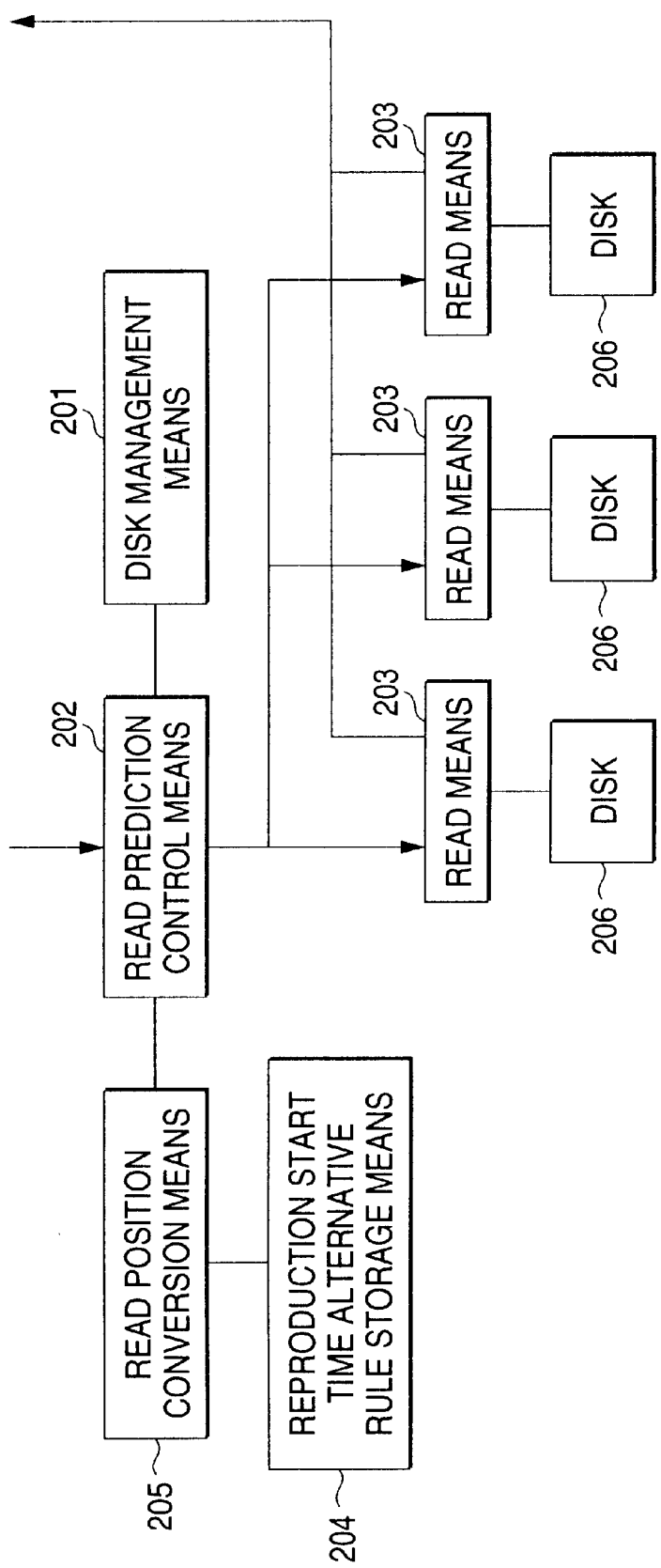
FIG. 2 is a block diagram of a continuous recorded information reproducing apparatus of the first embodiment of the invention.

FIG. 2 is a block diagram of a continuous recorded information reproducing apparatus of the invention.

The configuration of the continuous recorded information reproducing apparatus of the invention will be discussed with reference to FIG. 2. In the figure, numeral 201 denotes disk management means for managing a load state on each disk; numeral 202 denotes read prediction control means for receiving the disk number and the block address in a data read request together with reproduction state information and instructing read means 203 to read data from the specified position of the disk if the read prediction control means determines that the data can be read within the one-frame time and the data read does not hinder any other reproduction data read from the load on the disk and prediction of the data read state at the next time; numeral 203 denotes the above-mentioned read means for receiving an instruction from the read prediction control means 202 and reading data from the specified position of the disk; numeral 204 denotes reproduction start time alternative rule storage means for storing an alternative rule for reading alternative data at the reproduction start time; numeral 205 denotes read position conversion means for referencing the rule stored in the reproduction start time alternative rule storage means based on the reproduction state information accepted by the read prediction control means and converting access to the specified position of the specified disk into access to the specified position of the disk that can be read within the one-frame time while disk load is being checked in the disk management means; and numeral 206 denotes a disk for storing continuous data.

Next, a continuous data read procedure of the invention will be discussed with reference to FIGS. 3A and 3B.

First, a read procedure when reproduction is started will be discussed.

First, the disk number and the block address where read data is stored and reproduction state information are accepted at step 301. Here, the reproduction state information refers to information of "reproduction start" indicating new starting of reproduction of any continuous information.

The recorded information reproducing apparatus of the invention reads a plurality of moving picture data pieces concurrently; in fact, on each disk, data is read in order for each moving picture. That is, the read means is provided with a queue for storing read instructions and reads and processes the oldest one of the stored instructions in the queue. However, the read prediction control means does not see when the read instruction issued to the read means will be processed. Thus, the read prediction control means assumes that the instruction once issued to the read means is already read (is being read).

Whether or not desired data can be read within the one-frame time depends on the data length of the desired data, the disk read performance, and the disk load state. Let the data length of the data already being read on the disk be G bytes, the data length of the desired data be N bytes, the disk read speed be V (bytes/sec), and the one-frame time be T seconds. If the expression $$(G+N)/V<T \qquad (1)$$

holds, the desired data can be read from the disk within the one-frame time. Here, G is the total amount of the data lengths of the data assumed to be already being read by the data read prediction control means, as described above.

Specifically, if 200-KB and 300-KB data read instructions are already issued, G becomes 500 KB. The instructions stored in the queue of the read means are managed for each disk by the disk management means.

If the expression is satisfied, the desired data can be read from the disk within the stipulated period (in this case, the one-frame time). For convenience of the description, it is assumed that the data is read from disk 2. For example, it is assumed that read processing of different moving picture data already reproduced is performed just after, and the preceding time is data read from disk 1 and this time is data read from disk 2.

If the read does not satisfy the above-mentioned expression and read processing cannot be performed within the one-frame time, the data read cannot be completed within the stipulated time and reproduction of the moving picture is discontinued. This is caused by the fact that new data read of "reproduction start" described above interrupts. To avoid this, it is necessary to predict the read state of disk 2 at the next time. That is, when "reproduction start" is started, the disk access state at the next time, namely, disk 1 preceding the disk 2 is checked. Specifically, the disk management means is referenced and disk 1 is checked for the total data read amount of data read of the moving picture being reproduced. This is set to G1. Likewise, the total data read amount on disk 2 is set to G2. That is, if G in the above-mentioned expression is $$G=G1+G2 \qquad (2)$$

and the above-mentioned expression (1) is satisfied, data read of "reproduction start" can be executed from disk 2 and hindering any other reproduction data read can be avoided.

Thus, from the disk number, the load state on the corresponding disk is checked and predicted in the disk management means at step S302 and whether or not the desired data can be read within the one-frame time is determined at step 303. Here, the one-frame time becomes 33 msec (1 sec/30 frames) at a rate of 30 frames per sec for a moving picture.

If it is determined at step 303 that the desired data can be read within the one-frame time, control goes to step 304 at which data is read from the specified position of the disk. Here, the read prediction control means instructs the read means to read the desired data. On the other hand, the read prediction control means informs the disk management means that the desired data is being read. Then, the disk management means updates information of the data read state, namely, the load state managed for each disk at step 305.

On the other hand, if it is not determined at step 303 that the desired data can be read within the one-frame time, control goes to step 306 at which the alternative rule stored in the reproduction start time alternative rule storage means is referenced based on the accepted reproduction state information. The frame whose read is requested is changed to an alternative frame according to the alternative rule and the disk number is obtained at step 307. Likewise, from the obtained disk number, the load state on the corresponding disk is checked and predicted at step S302 and whether or not the desired data can be read from the disk within the one-frame time is checked at step 303. After this, the process is repeated.

Figure 3B:
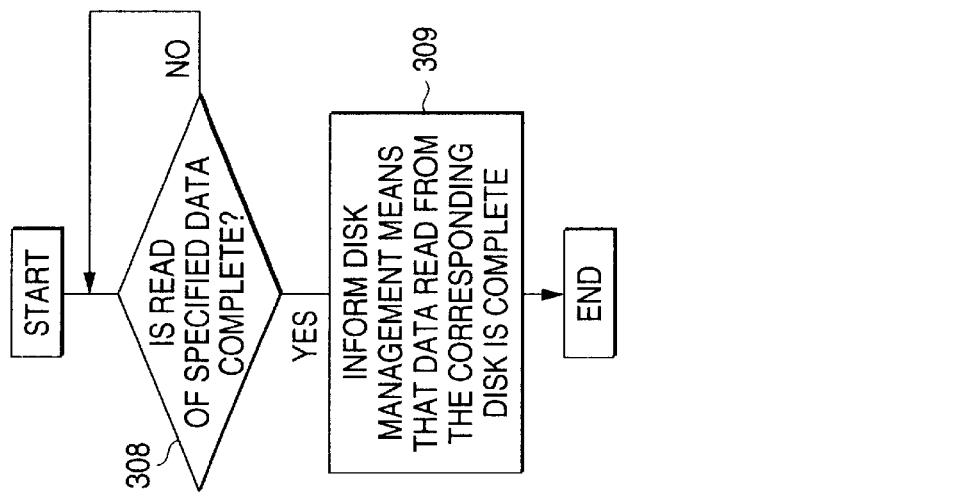
FIGS. 3A and 3B are flowcharts to show an example of a data read procedure in the first embodiment of the invention.
Figure 3A:
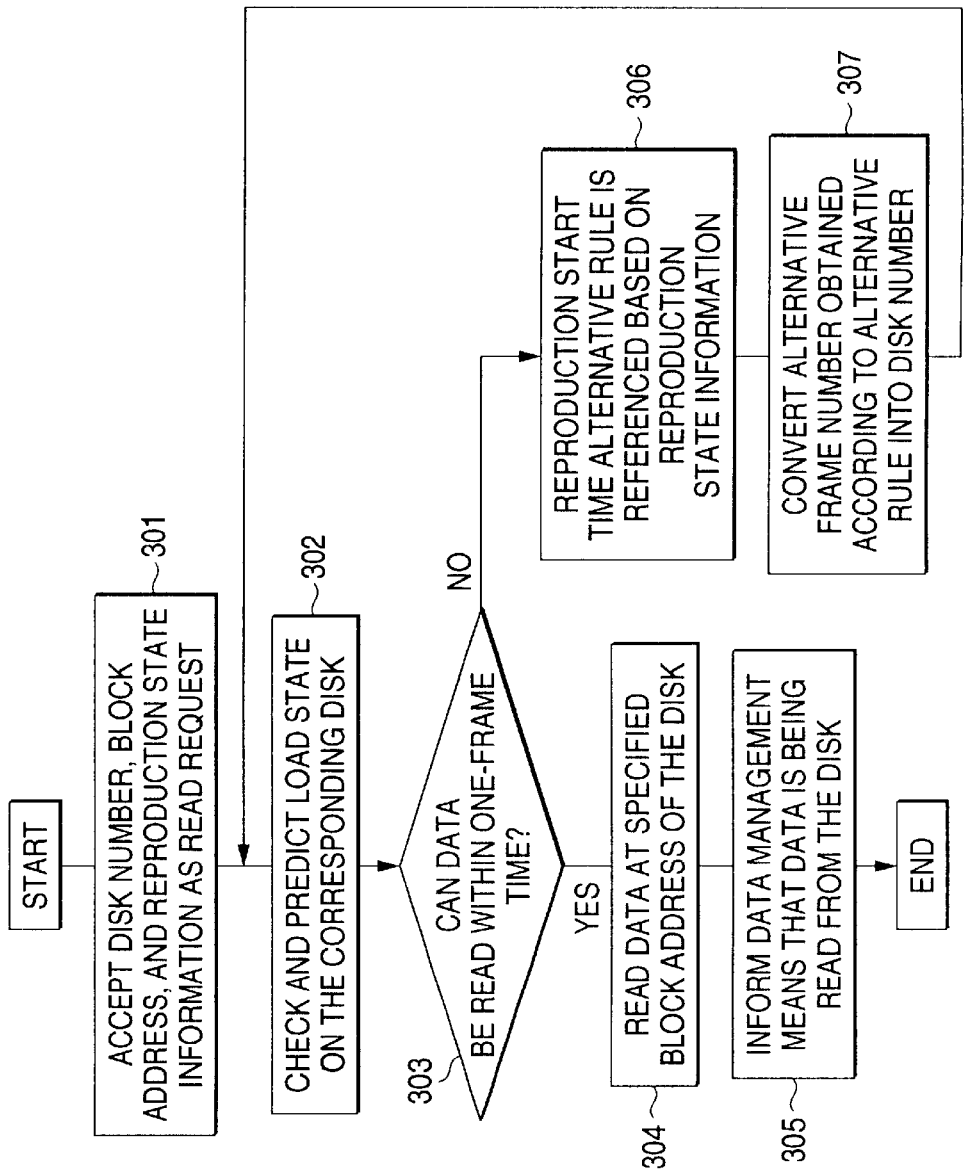

The read means checks the queue and performs read processing in sequence as shown in FIG. 3B. Whether or not the desired data can be read is checked and if the data read is complete at step 308, the disk management means is informed that the data read is complete. Then, the disk management means updates the load information on each disk at step 309.

The alternative rule at the reproduction start time is, for example, as follows: If continuous information is moving picture data, when an attempt is made to read the first frame, the top of the continuous information and it is determined that the frame cannot be read within the one-frame time, alternatively the second frame is read. If the second frame cannot be read either within the one-frame time, the third frame is read. Thus, the accessed disk is shifted until the frame that can be read within the one-frame time is found.

If the rule is followed, data in the frame different from the frame number accepted at the read prediction control means is read. However, it is considered that a shift of several frames at the reproduction start time of a moving picture does not introduce a problem on practical use depending on the application. By allowing the shift, the response at the moving picture reproduction start time can always be made within the one-frame time.

The shift occurs only at the reproduction start time. Because of reproduction of a moving picture, the following frames are read in order after the reproduction start time. This means that the disks to be accessed shift one after another in order. That is, a shift is caused to occur only at the reproduction start time and a disk under low load is simply accessed, whereby contiguous disks can be accessed in order for all read requests, so that it is made possible to read data without interruption.

In read of data being already reproduced rather than data read at the reproduction start time, data read access to any desired disk is executed without checking or predicting the load state on the disk at step 302. This means that step 304 is executed with steps 302 and 303 skipped, because the read of data being already reproduced is assigned the highest priority and it is guaranteed that the data read at the reproduction start time described above does not hinder the read of data being already reproduced.

FIG. 4 is a conceptual drawing. It shows time transition of disks and data read requests from three terminals 1, 2, and 3 for reading data. Here, it is assumed that a continuous information reproduction start request from the terminal 3 is accepted at time T+2.

At the time T+2, data read requested through the terminal 1 and that through the terminal 2 are executed on disks 1 and 3 ((1)' and (1)"). Reproduction start from the terminal 3 indicates read of frame number 1 of continuous information A, namely, data block 1. The data is stored on the disk 1 ((2)). However, the disk involves a read request from the terminal 2 ((1)'). Here, if data read requested through the terminal 3 is executed in addition to read requested through the terminal 2 and it is determined that read requested through the terminal 3 cannot be completed within the one-frame time, the read request frame number is changed from 1 to 2 ((3)) for the read request through the terminal 3. The disk 2 storing the frame number 2 does not involve any other read request and read requested through the terminal 3 can be executed within the one-frame time. Thus, if read can be once started, subsequently data read can be executed in order at times T+3 and T+4 without interruption.

As described above, in the embodiment, at the reproduction start time of continuous data, data is read from the disk from which data can be read within the one-frame time while the disk load state at the next time is being predicted (namely, for example, the read start position is a little shifted from the specified position by utilizing the fact that a shift of several frames at the reproduction start time of a moving picture does not introduce a problem on practical use depending on the application), so that a continuous recorded information reproducing apparatus which does not discontinue any other moving picture reproduction and can guarantee the response speed at the reproduction start time within the one-frame time can be provided; the apparatus provides a large practical advantage.

Second Embodiment

A second embodiment of the invention will be discussed with reference to FIGS. 5, 6A and 6B.

Figure 5:
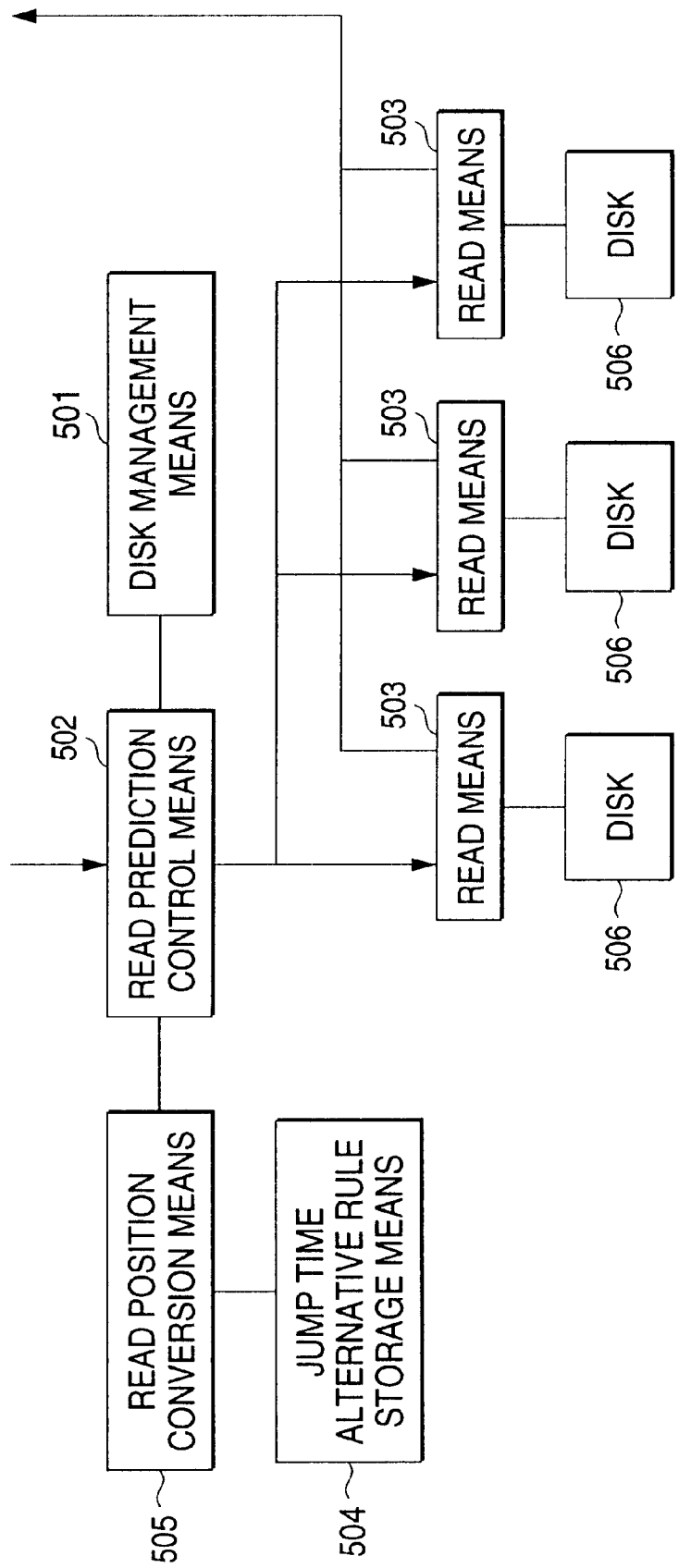
FIG. 5 is a block diagram of a continuous recorded information reproducing apparatus of a second embodiment of the invention.

FIG. 5 is a block diagram of a continuous recorded information reproducing apparatus of the invention. The configuration of the continuous recorded information reproducing apparatus of the invention will be discussed with reference to FIG. 5. The configuration shown in FIG. 5 is the same as that in FIG. 2 except that jump time alternative rule storage means 504 for storing an alternative rule at the jump time is provided in place of the reproduction time alternative rule storage means 204.

FIG. 6A shows a continuous data read procedure of the invention. The procedure shown in FIG. 6A is the same as that in FIG. 3A except that the alternative rule at the jump time is referenced at step 606.

When a read request is accepted at read prediction control means 502, reproduction state information indicates jump, thus the rule stored in the jump time alternative rule storage means 504 is applied as an alternative rule. An example of the rule is as follows: Letting the jump destination frame number be k, a disk load state is checked in the range of n frames preceding and following the frame number k, namely, in the range of k+n to k−n (n=1, 2, 3 . . . ), and alternative data is read from the disk from which data can be read within the one-frame time. An alternative frame is read instead of the frame having the frame number contained in a read request at the jump time as the reproduction start time, whereby data can be read within the one-frame time and a high-speed response can be provided. An alternative frame is simply applied only at the jump time, whereby later data read can be executed in order without interruption as in the first embodiment.

Thus, in the second embodiment, at the jump time in reproduction of continuous data, data is read from the disk from which data can be read within the one-frame time while the disk load state at the next time is being predicted, so that a continuous recorded information reproducing apparatus which does not discontinue any other moving picture reproduction and can guarantee the response speed at the jump time within the one-frame time can be provided; the apparatus provides a large practical advantage.

Third Embodiment

A third embodiment of the invention will be discussed with reference to FIGS. 7 to 9.

Figure 7:
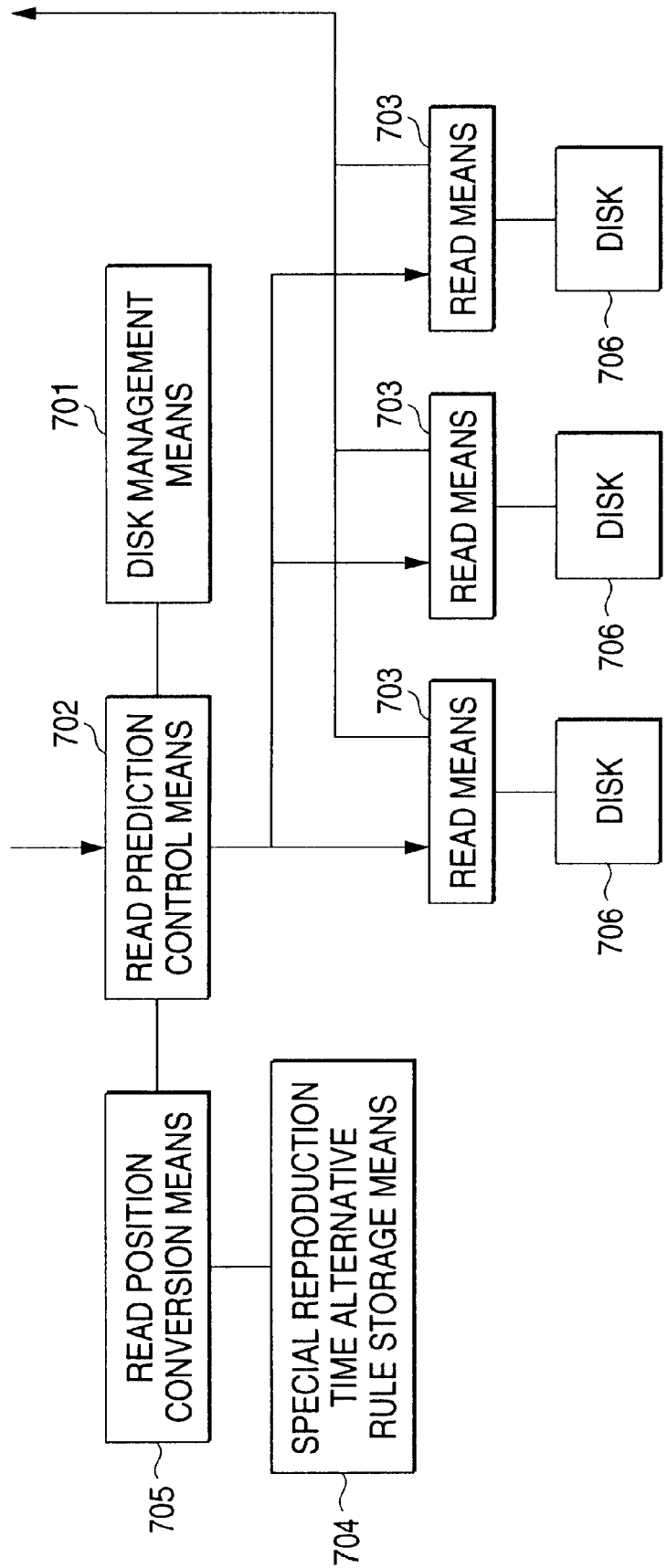
FIG. 7 is a block diagram of a continuous recorded information reproducing apparatus of a third embodiment of the invention.
Figure 8:
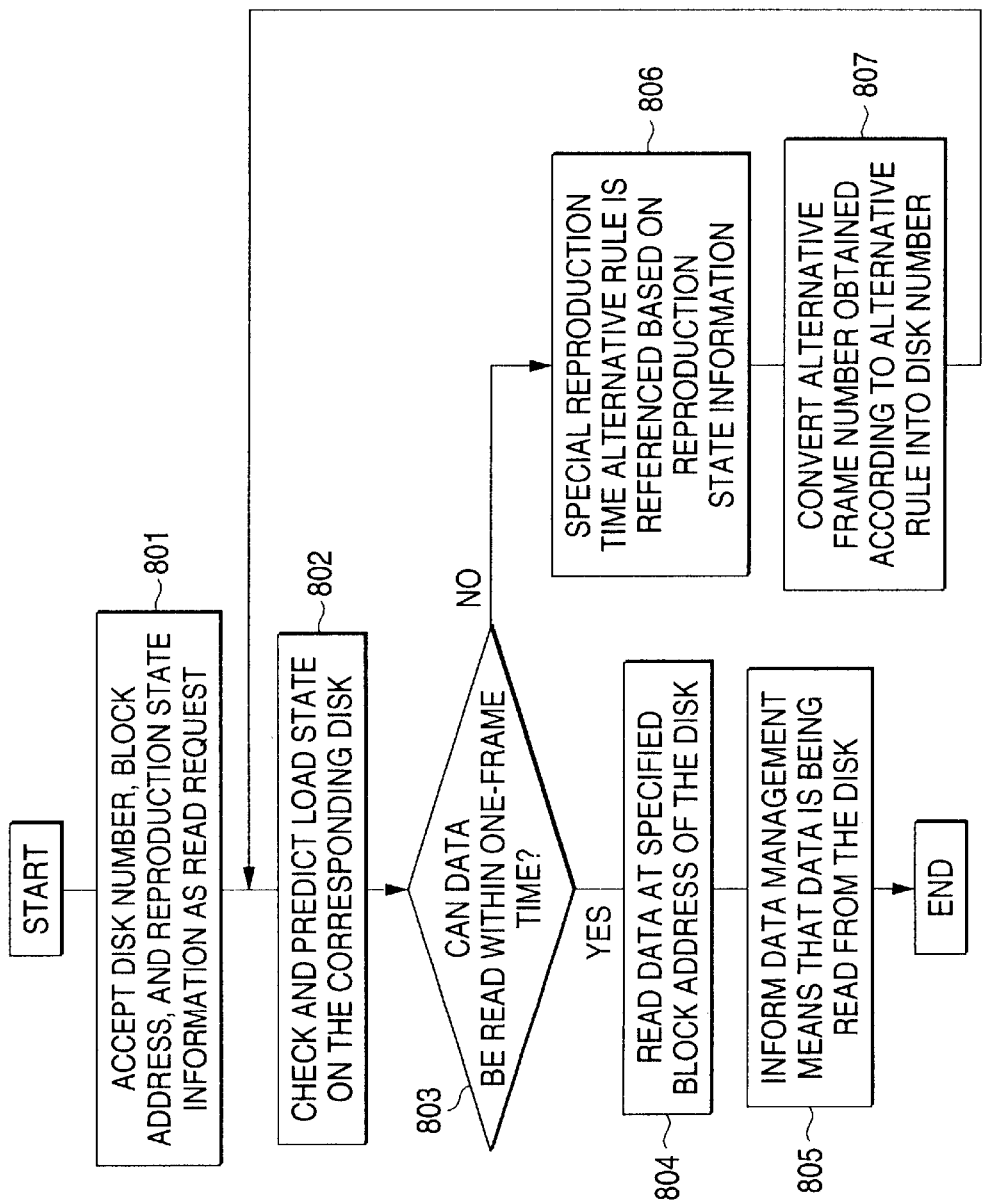
FIGS. 8A and 8B are flowcharts to show an example of a data read procedure in the third embodiment of the invention.

FIG. 7 is a block diagram of a continuous recorded information reproducing apparatus of the invention. The configuration of the continuous recorded information reproducing apparatus of the invention will be discussed with reference to FIG. 7. The configuration shown in FIG. 7 is the same as that in FIG. 2 except that special reproduction time alternative rule storage means 704 for storing an alternative rule at the special reproduction time of forward double-speed reproduction, forward quad-speed reproduction, backward double-speed reproduction, backward quad-speed reproduction, etc., is provided in place of the reproduction time alternative rule storage means 204. FIG. 8 shows a continuous data read procedure of the invention. The procedure shown in FIG. 8 is the same as that in FIG. 3 except that the alternative rule at the special reproduction time is referenced at step 806.

As in the first embodiment previously described with reference to FIG. 4, in the invention, once data read is started, later data read can be executed in order without interruption, because the number of frames read for the unit time is the same in every data and the frames are read in sequence without being skipped.

However, the double-speed reproduction is executed at the same frame rate as the standard reproduction, for example, 30 frames per sec, in the double-speed reproduction, data is read every other frame. In the quad-speed reproduction, data is read every four frames. This means that access is executed every other disk and every four disks and that data read in the standard reproduction for accessing disks while shifting one at a time in order is interrupted. Of course, hindering the data read in the standard reproduction must be avoided. Thus, in the data read at the special reproduction time, from the disk storing desired data, the data may be unable to be read within the one-frame time because any other standard reproduction data is being read, etc.

At the special reproduction time, a special reproduction time alternative rule is provided. For example, the rule is defined as follows: When it is determined that the frame to be read cannot be read within the one-frame time, frame data in n frames preceding and following the frame to be read is read instead. Here, for example, n can be 1 in the double-speed reproduction, namely, one preceding frame and one following frame; n can be 1 or 2 in the quad-speed reproduction, namely, one or two preceding frames and one or two following frames. The read frames may be shifted only backward or forward. Some shift in read frame is allowed with respect to the desired frame, whereby it is made possible to executed data read in mixed modes of standard reproduction and pseudo special reproduction.

Figure 9:
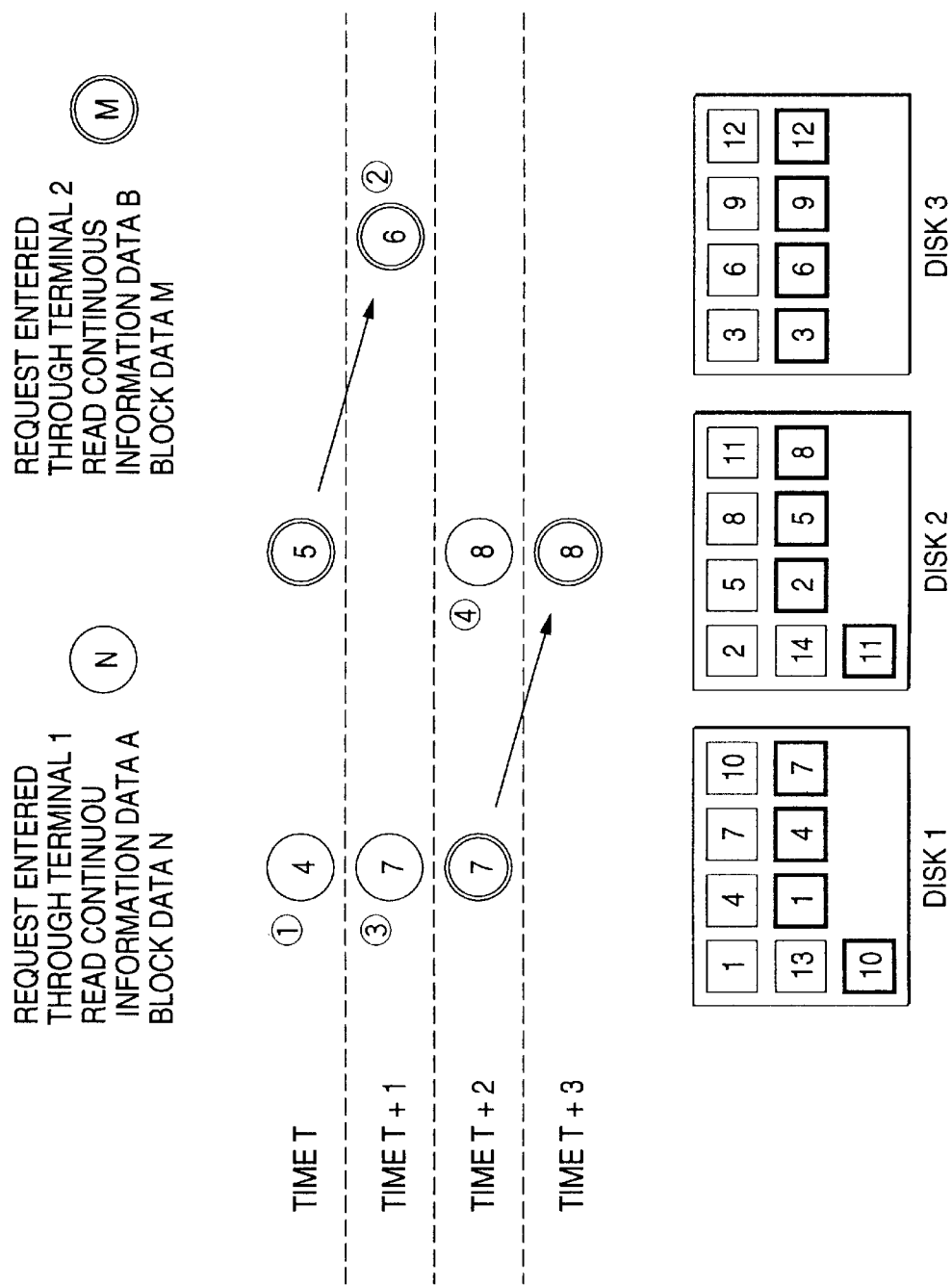
FIG. 9 is a time transition diagram of data read requests in the third embodiment of the invention.

FIG. 9 is a conceptual drawing. It shows time transition of disks and data read requests from two terminals 1 and 2 for reading data. At the terminal 1, double-speed reproduction is executed starting at time T and at the terminal 2, standard reproduction data read is executed all the time. At the terminal 1, data of continuous information A is read and double-speed reproduction is executed, thus essentially the read frame numbers become 4 ((1)), 6, 8, 10. However, at time T+1, data read access is being made to disk 3 from the terminal 2 ((2)) and it is determined that data read in the frame of frame number 6 from the terminal 1 is not complete within the one-frame time. Then, one read frame is shifted from the frame number 6 to frame number 7. The frame number 7 is stored on disk 1 and the data in the frame of the frame number 7 can be read within the one-frame time and thus is read ((3)). At time T+3, frame number 8 is read ((4)). When the reproduction state is changed from the standard reproduction state to special reproduction, data is also read according to a similar procedure and a high-speed response (the time taken in starting special reproduction is within the one-frame time) can be provided.

Thus, in the third embodiment, at the special reproduction time of continuous data, data is read from the disk from which data can be read within the one-frame time while the disk load state at the next time is being predicted, whereby a continuous recorded information reproducing apparatus which does not discontinue any other moving picture reproduction, can execute data read in mixed modes of standard-speed reproduction and special reproduction, and can guarantee the response speed at the special reproduction start time within the one-frame time can be provided; the apparatus provides a large practical advantage.

Fourth Embodiment

A fourth embodiment of the invention will be discussed with reference to FIGS. 10 to 12.

Figure 10:
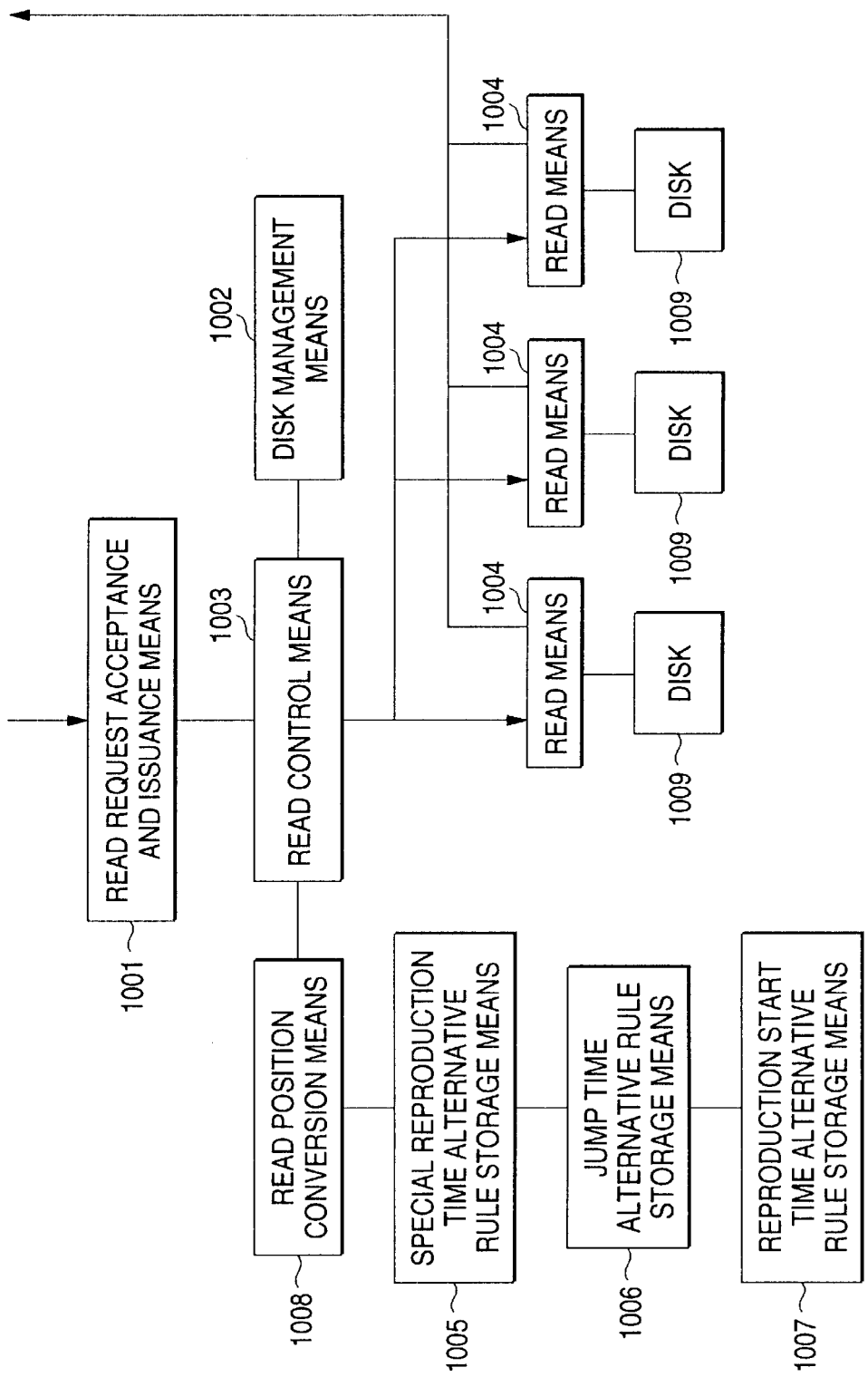
FIG. 10 is a block diagram of a continuous recorded information reproducing apparatus of a fourth embodiment of the invention.

FIG. 10 is a block diagram of a continuous recorded information reproducing apparatus of the invention. The configuration of the continuous recorded information reproducing apparatus of the invention will be discussed with reference to FIG. 10. The configuration shown in FIG. 10 is the same as that in FIGS. 2, 5, 7 except that read request acceptance and issuance means 1001 for accepting data read requests, assigning priorities thereto, and issuing the data read requests and read control means 1003 are provided.

The read request acceptance and issuance means 1001 is provided with two (or more) queues of a data read queue used during standard reproduction and a data read queue used at the special reproduction time, the reproduction start time, or the jump time. The read request acceptance and issuance means 1001 processes a request stored in the former queue, then a request stored in the latter queue.

The read control means 1003 gets the data read state on the disk from which data is to be read from disk management means. Let the data length of the data already being read on the disk be G bytes, the data length of the desired data be N bytes, the disk read speed be V (bytes/sec), and the one-frame time be T seconds. If the expression $$(G+N)/V<T \quad (3)$$

holds, the read control means 1003 assumes that the desired data can be read from the disk within the one-frame time, and gives a data read instruction to data read means. The read control means 1003 is equivalent to the read prediction control means in the first embodiment, the second embodiment, the third embodiment previously described from which prediction of data read at the next time is excluded.

Figure 11B:
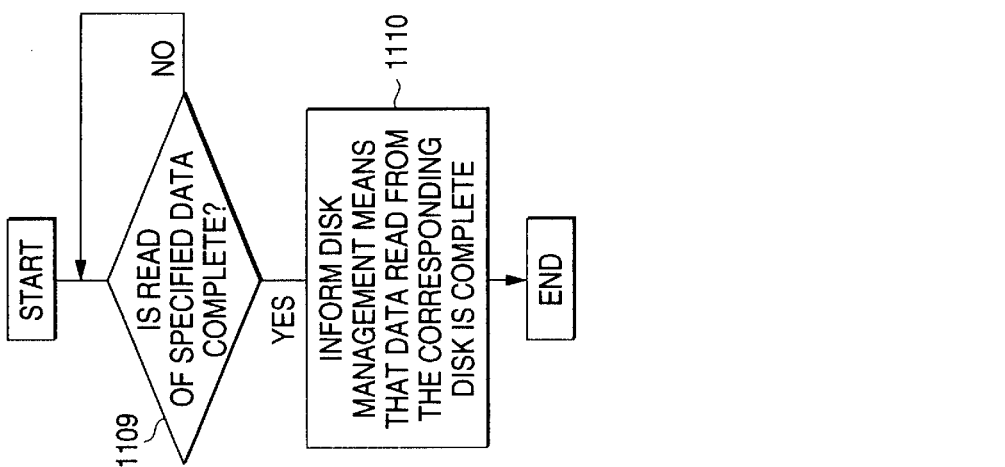
FIG. 11 are flowcharts to show an example of a data read procedure in the fourth embodiment of the invention.
Figure 11A:
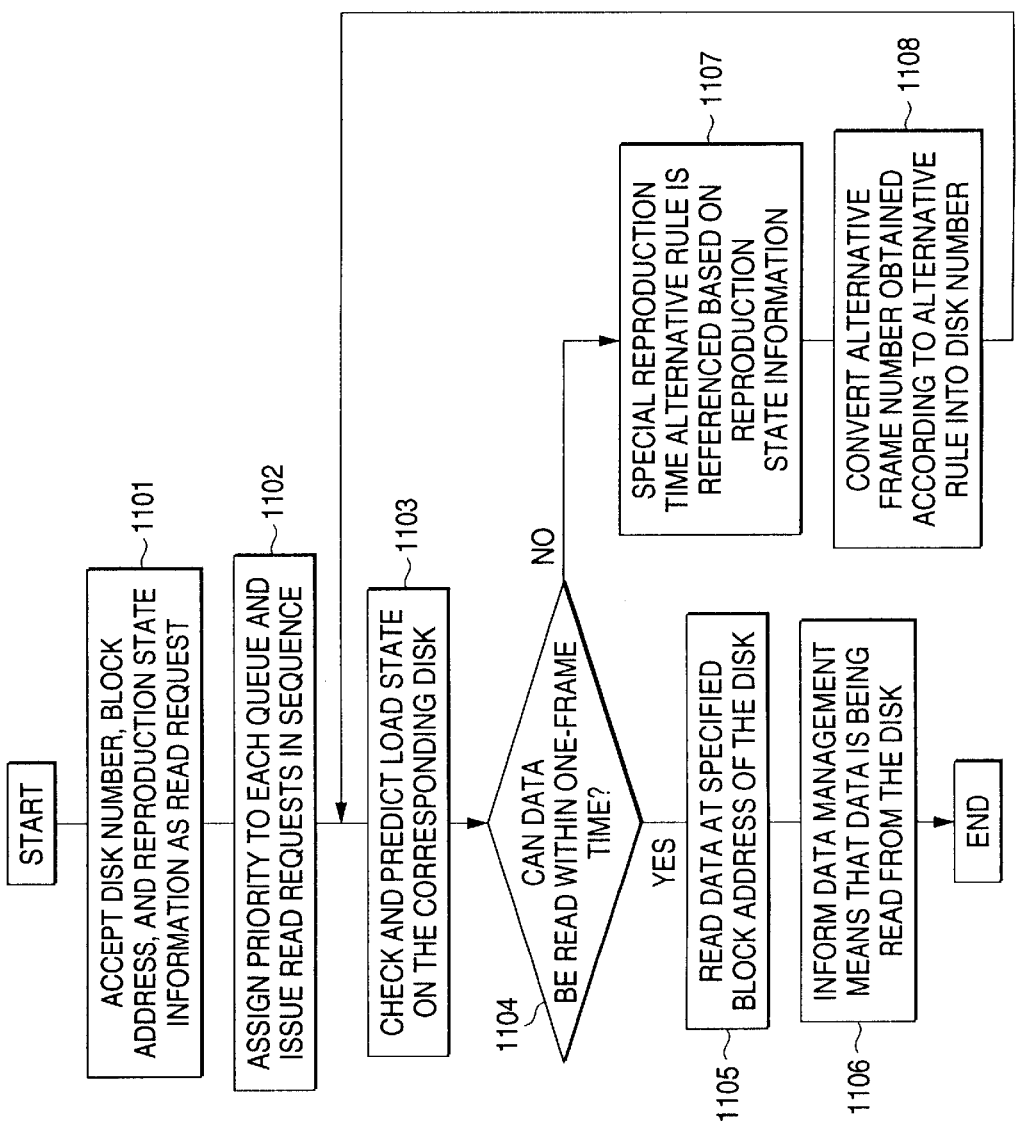

FIGS. 11A and 11B show continuous data read procedure of the invention. The procedure shown in FIG. 11 is the same as that in FIG. 8 except that a priority is assigned to each queue and read requests are issued in sequence at step 1102. In the first, second, and third embodiments, the data read state at the next time is predicted in order not to hinder standard reproduction data read. In the fourth embodiment of the invention, instead of executing no prediction, the read request acceptance and issuance means 1001 for producing a similar effect to the prediction is provided. At steps 1101 and 1102, the read request acceptance and issuance means 1001 accepts a data read request and stores the request in either of the queues depending on the reproduction state of standard reproduction or not.

On the other hand, as an example, first the data read requests stored in the data read queue used during standard reproduction are issued to the read control means 1003 and if issuance of all requests is complete, then the data read requests stored in the data read queue at the special reproduction, reproduction start, or jump time are issued.

In doing so, first the standard reproduction data read requests are issued to the read means in sequence, next a reproduction start, jump data read request or a special reproduction data read request can be issued to the read means in sequence while an alternative rule is applied according to the read state on each disk, whereby any data read request other than the standard reproduction data read requests is always issued after the standard reproduction data read request is issued; the advantage that the standard reproduction data read for accessing contiguous disks in sequence is not interrupted and is not hindered can be provided.

Thus, in the fourth embodiment, the read request storage queues assigned processing priorities are used, whereby a continuous recorded information reproducing apparatus which does not discontinue standard reproduction data read, reads from the disk where data read at the reproduction start time, the jump time, or the special reproduction time can be completed within the one-frame time, and can guarantee the response speed within the one-frame time can be provided; the apparatus provides a large practical advantage.

In the first to fourth embodiments, the continuous information data (moving picture) to be read is stored on a plurality of disks in the disk number order starting at the top of the moving picture information; however, if the moving picture information pieces are distributed under the same rule, to read the moving picture information pieces concurrently, they may be read under the same rule (a read collision does not occur), thus no problem is involved.

Thus, in the first aspect of the invention, at the reproduction start time of continuous data, data is read from the disk from which data can be read within the one-frame time while the disk load state at the next time is being predicted, so that a continuous recorded information reproducing apparatus which does not discontinue any other moving picture reproduction and can guarantee the response speed at the reproduction start time within the one-frame time can be provided; this is an advantage of the invention.

In the second aspect of the invention, at the jump time in reproduction of continuous data, data is read from the disk from which data can be read within the one-frame time while the disk load state at the next time is being predicted, so that a continuous recorded information reproducing apparatus which does not discontinue any other moving picture reproduction and can guarantee the response speed at the jump time within the one-frame time can be provided; this is another advantage of the invention.

In the third aspect of the invention, at the special reproduction time of continuous data, data is read from the disk from which data can be read within the one-frame time while the disk load state at the next time is being predicted, whereby a continuous recorded information reproducing apparatus which does not discontinue any other moving picture reproduction, can execute data read in mixed modes of standard-speed reproduction and special reproduction, and can guarantee the response speed at the special reproduction start time within the one-frame time can be provided; this is still another advantage of the invention.

In the fourth aspect of the invention, the read request storage queues assigned processing priorities are used, whereby a continuous recorded information reproducing apparatus which does not discontinue standard reproduction data read, reads from the disk where data read at the reproduction start time, the jump time, or the special reproduction time can be completed within the one-frame time, and can guarantee the response speed within the one-frame time can be provided; this is another advantage of the invention.

What is claimed is:

1. A continuous recorded information reproducing apparatus for reading and reproducing continuous information data recorded on a plurality of disks in arbitrary data size units, comprising:

disk management means for managing a load state on each disk;

read means for reading data from a specified position of a disk;

read prediction control means for accepting a read request containing data read position information together with reproduction state information indicating reproducing or reproduction start, looking up the load state on each disk in said disk management means, determining whether or not the requested data can be read within a stipulated time based on the load state on the disk storing the data and prediction of a data read state at the next time, and instructing said read means to read the data from the specified position of the disk;

reproduction start time alternative rule storage means for storing an alternative rule for reading alternative data at reproduction start time; and read position conversion means for converting the data read from the specified position of the specified disk into a disk from which data can be read within the stipulated time and a read position on the disk based on the reproduction state information indicating the reproduction start and the rule stored in said reproduction start time alternative rule storage means.

2. A continuous recorded information reproducing apparatus for reading and reproducing continuous information data recorded on a plurality of disks in arbitrary data size units, comprising:

disk management means for managing a load state on each disk;

read means for reading data from a specified position of a disk;

read prediction control means for accepting a read request containing data read position information together with reproduction state information indicating jump for changing a reproduction position to an arbitrary position such as reproducing, fast forward, or rewind, looking up the load state on each disk in said disk management means, determining whether or not the requested data can be read within a stipulated time based on the load state on the disk storing the data and prediction of a data read state at the next time, and instructing said read means to read the data from the specified position of the disk;

jump time alternative rule storage means for storing an alternative rule at jump time for changing the reproduction position; and read position conversion means for converting the data read from the specified position of the specified disk into a disk from which data can be read within the stipulated time and a read position on the disk based on the reproduction state information indicating the jump and the rule stored in said jump time alternative rule storage means.

3. A continuous recorded information reproducing apparatus for reading and reproducing continuous information data recorded on a plurality of disks in arbitrary data size units, comprising:

disk management means for managing a load state on each disk;

read means for reading data from a specified position of a disk;

read prediction control means for accepting a read request containing data read position information together with reproduction state information indicating special reproduction such as reproducing, double-speed reproduction, or quad-speed reproduction, looking up the load state on each disk in said disk management means, determining whether or not the requested data can be read within a stipulated time based on the load state on the disk storing the data and prediction of a data read state at the next time, and instructing said read means to read the data from the specified position of the disk;

special reproduction time alternative rule storage means for storing an alternative rule at the time of special reproduction such as double-speed reproduction or quad-speed reproduction; and read position conversion means for converting the data read from the specified position of the specified disk into a disk from which data can be read within the stipulated time and a read position on the disk based on the reproduction state information indicating the special reproduction and the rule stored in said special reproduction time alternative rule storage means.

4. A continuous recorded information reproducing apparatus for reading and reproducing continuous information data recorded on a plurality of disks in arbitrary data size units, said apparatus comprising:

disk management means for managing a load state on each disk;

read means for reading data from a specified position of a disk;

read request acceptance and issuance means for accepting a read request containing data read position information together with reproduction state information indicating reproducing or reproduction start, classifying the accepted read requests into those for reading data being reproduced and others, assigning a priority to the read requests, and executing sequential read;

read control means for looking up the load state on each disk in said disk management means, determining whether or not the requested data can be read within a stipulated time based on the load state on the disk storing the data, and instructing said read means to read the data from the specified position of the disk;

reproduction start time alternative rule storage means for storing an alternative rule for reading alternative data at reproduction start time; and read position conversion means for converting the data read from the specified position of the specified disk into a disk from which data can be read within the stipulated time and a read position on the disk based on the reproduction state information and the rule stored in said reproduction start time alternative rule storage means.

5. The continuous recorded information reproducing apparatus as claimed in claim 4, further comprising jump time alternative rule storage means for storing an alternative rule at jump time for changing a reproduction position.

6. The continuous recorded information reproducing apparatus as claimed in claim 4, further comprising special reproduction time alternative rule storage means for storing an alternative rule for reading alternative data at special reproduction time.

7. The continuous recorded information reproducing apparatus as claimed in any of claims 1 to 6, wherein the continuous information data is moving picture information, and is stored under the same rule as any other moving picture information in data size units of one-frame data of the moving picture.

8. The continuous recorded information reproducing apparatus as claimed in any of claims 1 to 6, wherein the continuous information data is moving picture information in an MPEG format, and is stored under the same rule as any other moving picture information in 1-GOP data units.

9. The continuous recorded information reproducing apparatus as claimed in any of claims 1 to 6, wherein the stipulated time for determining whether or not data can be read is one-frame time in a moving picture.

10. The continuous recorded information reproducing apparatus as claimed in claim 1 or 4, wherein the reproduction start time alternative rule is to forward shift n frames at a time (n is an integer of one or more).

11. The continuous recorded information reproducing apparatus as claimed in claim 2 or 5, wherein the jump time alternative rule is to forward shift n frames at a time (n is an integer of one or more).

12. The continuous recorded information reproducing apparatus as claimed in claim 2 or 5, wherein the jump time alternative rule is to backward shift n frames at a time (n is an integer of one or more).

13. The continuous recorded information reproducing apparatus as claimed in claim 3 or 6, wherein the special reproduction time alternative rule is to forward shift n frames at a time (n is an integer of one or more).

14. The continuous recorded information reproducing apparatus as claimed in claim 3 or 6, wherein the special reproduction time alternative rule is to backward shift n frames at a time (n is an integer of one or more).

15. The continuous recorded information reproducing apparatus as claimed in claim 3 or 6, wherein if the special reproduction time alternative rule is to shift a maximum of n−1 frames at a time at n-times-speed reproduction time and an alternative frame is retrieved, when it is determined that data cannot be read within one-frame time, the frame data read at the preceding time is used.

* * * * *

UNITED STATES PATENT AND TRADEMARK OFFICE
CERTIFICATE OF CORRECTION

PATENT NO. : 6,678,469 B1
DATED : January 13, 2004
INVENTOR(S) : Atsushi Minemura et al.

It is certified that error appears in the above-identified patent and that said Letters Patent is hereby corrected as shown below:

<u>Title page,</u>
Item [30], Foreign Application Priority Data, please delete "Feb. 10, 1999", and insert therefor -- Feb. 1, 1999 --.

Signed and Sealed this

Twentieth Day of July, 2004

JON W. DUDAS
*Acting Director of the United States Patent and Trademark Office*